(12) United States Patent
Flynn et al.

(10) Patent No.: US 7,899,846 B2
(45) Date of Patent: Mar. 1, 2011

(54) DECLARATIVE MODEL EDITOR GENERATION

(75) Inventors: James R. Flynn, Seattle, WA (US);
Laurent Mollicone, Kirkland, WA (US);
William A. Manis, Sammamish, WA (US); Charles J. Strempler, Seattle, WA (US); Kean E E Lim, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 11/864,357

(22) Filed: Sep. 28, 2007

(65) Prior Publication Data
US 2009/0089299 A1   Apr. 2, 2009

(51) Int. Cl.
*G06F 7/00* (2006.01)
(52) U.S. Cl. .................................... 707/803
(58) Field of Classification Search ................ 707/100, 707/790, 601, 803, 809
See application file for complete search history.

(56) References Cited

U.S. PATENT DOCUMENTS

| | | | |
|---|---|---|---|
| 5,764,241 A | 6/1998 | Elliott et al. | |
| 5,850,548 A | 12/1998 | Williams | |
| 5,936,628 A | 8/1999 | Kitamura et al. | |
| 6,215,489 B1 | 4/2001 | Kaplan | |
| 6,937,257 B1 | 8/2005 | Dunlavey | |
| 7,089,256 B2 | 8/2006 | Smialek | |
| 7,487,515 B1 * | 2/2009 | Jones et al. | 719/328 |
| 2003/0065527 A1 | 4/2003 | Yeh et al. | |
| 2003/0204481 A1 * | 10/2003 | Lau | 707/1 |
| 2004/0015858 A1 | 1/2004 | Seto et al. | |
| 2005/0066338 A1 * | 3/2005 | Bloesch et al. | 719/328 |
| 2006/0112114 A1 * | 5/2006 | Yu et al. | 707/100 |
| 2006/0129976 A1 * | 6/2006 | Brand et al. | 717/109 |
| 2006/0173894 A1 | 8/2006 | Kristoffersen et al. | |
| 2007/0016607 A1 * | 1/2007 | Yu et al. | 707/102 |
| 2007/0089089 A1 * | 4/2007 | Kelly et al. | 717/110 |
| 2008/0114740 A1 * | 5/2008 | Vergottini | 707/3 |
| 2008/0126352 A1 * | 5/2008 | Case | 707/10 |

OTHER PUBLICATIONS

Tools for Model-Based Real-Time System Synthesis http://ieeexplore.ieee.org/iel3/4458/12639/00581812.pdf?isNumber=.
Syntax Analysis for Diagram Editors: A Constraint Satisfaction Problem http://delivery.acm.org/10.1145/1140000/1133300/p167-minas.pdf?key1=1133300&key2=179512811&coll=Portal&dl=GUIDE&CFID=17286036&CFTOKEN=40030580.

(Continued)

*Primary Examiner*—John R. Cottingham
*Assistant Examiner*—Mohammed R Uddin
(74) *Attorney, Agent, or Firm*—Workman Nydegger

(57) ABSTRACT

Embodiments are directed to generating declarative model editors. A computer system receives a first user input indicating a selection of a native underlying schema that includes constraints that are to be followed by models based on the native schema. The computer system receives a second user input indicating a declarative entry that includes user-configurable model editor characteristics. The computer system automatically generates a declarative model editor based on the selected native schema and user-configurable model editor characteristics. Other embodiments are directed to editing models using declarative model editors. A computer system receives user input indicating a declarative entry to be applied to a model, generates a declarative model editor based on the declarative entry, receives a model that is editable by the generated declarative model editor, and edits user-configurable characteristics of the model. The model characteristics conform to the constraints in the native underlying schema.

20 Claims, 3 Drawing Sheets

OTHER PUBLICATIONS

Automatic Generation of Intelligent Diagram Editors http://delivery.acm.org/10.1145/940000/937553/p224-s_chok.pdf? key1=937553&key2=6410612811&coll=Portal&dl=GUIDE&CFID=17286036&CFTOKEN=40030580.

* cited by examiner

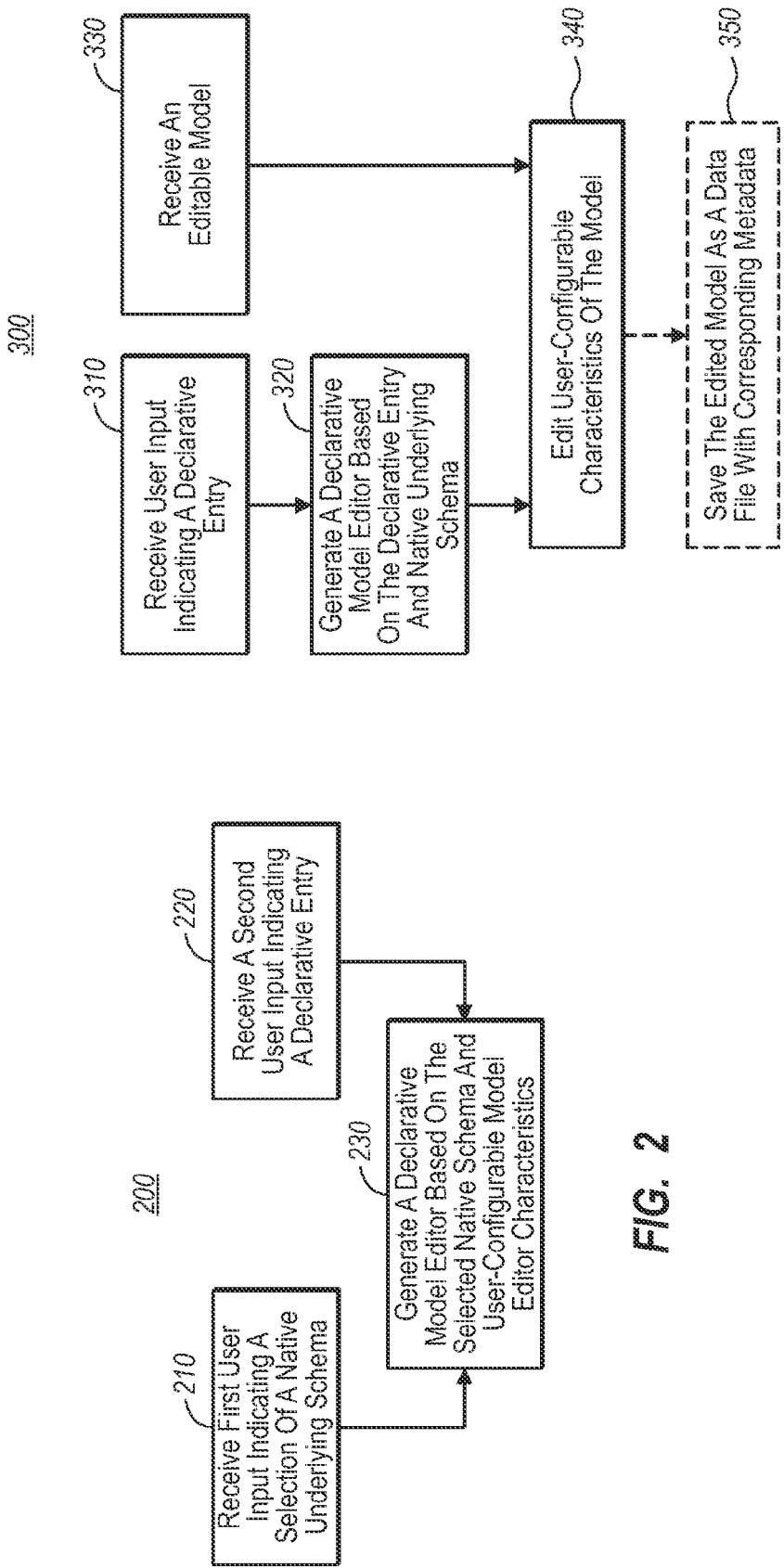

DECLARATIVE MODEL EDITOR GENERATION

BACKGROUND

Computers have become highly integrated in the workforce, in the home, and in mobile devices. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications can be used to generate and manipulate models. For example, businesses and other entities may use models to describe processes and systems. Models may also represent different types of information in various forms. In some cases, a model may represent data in the form of a flow diagram. In other cases, a model may represent data in the form of process flows, flowcharts, process diagrams and/or control charts. In other cases, models are used to illustrate organizational relationships between resources in a system. These models are often referred to as organizational charts. In a broader sense, models may be used to show any type of relationship information between different objects.

Typically, models have associated schemas that describe the terminology used in the model. The schema acts as a sort of legend, allowing a user or software application to consult the schema to determine the intended meaning of a term or symbol used in the model. Some schemas can include user-definable tags (e.g. extensible markup language (XML) tags), as well as metadata that corresponds to various elements in the model. The metadata can be used to describe properties of an object such as the object's look and feel, its layout and even its content. Thus, computer-run software applications can be used to generate and manipulate models.

BRIEF SUMMARY

Embodiments described herein are directed to generating declarative model editors and editing models using a generated declarative model editor. In one embodiment, a computer system includes a framework for generating a declarative model editor configured to provide model creation and editing functionality for a user. The computer system includes a receiving module configured to receive a user input indicating a selection of a native underlying schema, selected from multiple native underlying schemas, that is to be used in the generation of a declarative model editor corresponding to the selected native schema. The native schema includes constraints that are to be followed by models based on the native schema.

The computer system has another receiving module configured to receive a another user input indicating a declarative entry that includes user-configurable model editor characteristics configurable by a user for application to the models based on the selected native schema, where the models are instances of the native schema. The computer system also has a declarative model editor generation module configured to automatically generate a declarative model editor based on the selected native schema and one or more user-configurable model editor characteristics.

In another embodiment, a computer system receives user input indicating a declarative entry to be applied to a model, where the declarative entry includes constraints associated with objects of the model. The computer system generates a declarative model editor based on the declarative entry, receives a model that is editable by the generated declarative model editor, and edits user-configurable characteristics of the model. The model characteristics conform to the constraints in the native underlying selected schema.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 illustrates a flowchart of an example method for generating a declarative model editor configured to provide model creation and editing functionality for a user.

FIG. 3 illustrates a flowchart of an example method for editing one or more characteristics of a model using a declarative model editor.

DETAILED DESCRIPTION

Figure 1:
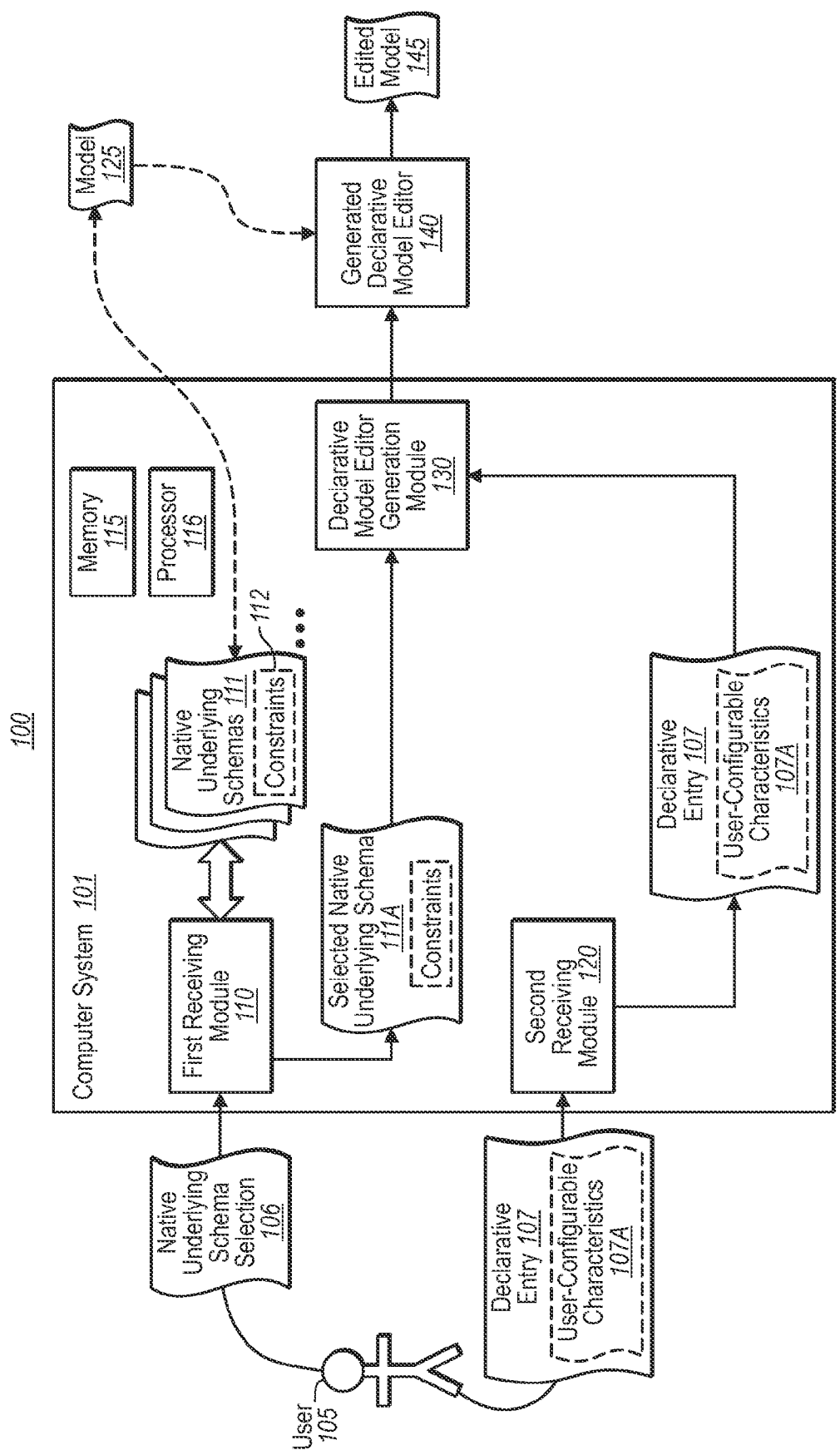
FIG. 1 illustrates a computer architecture in which embodiments of the present invention may operate including generating declarative model editors and editing models using generated declarative model editors.

Embodiments described herein are directed to generating declarative model editors and editing models using a generated declarative model editor. In one embodiment, a computer system includes a framework for generating a declarative model editor configured to provide model creation and editing functionality for a user. The computer system includes a receiving module configured to receive a user input indicating a selection of a native underlying schema, selected from multiple native underlying schemas, that is to be used in the generation of a declarative model editor corresponding to the selected native schema. The native schema includes constraints that are to be followed by models based on the native schema.

The computer system has another receiving module configured to receive a another user input indicating a declarative entry that includes user-configurable model editor characteristics configurable by a user for application to the models based on the selected native schema, where the models are instances of the native schema. The computer system also has a declarative model editor generation module configured to automatically generate a declarative model editor based on the selected native schema and one or more user-configurable model editor characteristics.

In another embodiment, a computer system receives user input indicating a declarative entry to be applied to a model, where the declarative entry includes constraints associated with objects of the model. The computer system generates a declarative model editor based on the declarative entry, receives a model that is editable by the generated declarative model editor, and edits user-configurable characteristics of the model. The model characteristics conform to the constraints in the native underlying schema.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 101. In some embodiments, computer system 101 may include system memory 115 and a processor 116. As explained above, memory 115 may be any type of computer memory including RAM, ROM, solid state, magnetic or other memory. Similarly, processor 116 may be any type of processor, microcontroller, state machine or other means of processing information and/or controlling computer system functionality.

Computer system 101 may also include a first receiving module 110 configured to receive a native underlying schema selection 106 from a computer user. In some cases, a computer user may be a software or program developer (e.g. developer 105). In other cases, a computer user may be any type of computer user, regardless of the user's knowledge of programming or computer functionality. Thus, as used herein, developer 105 may refer to computer users that have advanced knowledge about computer programming as well as those computer users that have little or no knowledge of computer programming. Developer 105 may access computer system 101 directly or remotely over a network connection. First receiving module 110 has access to native underlying schemas 111 with corresponding constraints 112. Native underlying schemas 111 may include a variety of different schemas, including list-based schemas, diagram-based schemas, tree-based and other types of schemas.

A schema, as the term is used herein, is a framework of terms and definitions that can be used to describe a document. As explained above, a schema may include tags (e.g. XML) that can be defined by a user. Then, when a developer or other user creates documents based on the schema, similar elements will have a similar structure or similar content, based on the constraints of the schema. Schema constraints 112 can be used to allow or disallow certain types of content with relation to different tags and can also allow or disallow relationships between data types or data fields in a model.

A model, as the term is used herein, can include any type of framework or structure that allows information to be presented to a user. Such a framework can be used to organize information. For example, models may be used to illustrate organizational relationships between resources in a system. These are often referred to as organizational charts or org charts. Org charts often present information in a hierarchical, top to bottom structure. Models can also be used to show process flows. Such models are often referred to as flow diagrams, process flows, flowcharts, process diagrams or control charts. These models show the various routes a process can take on its way to completion. Other models capable of being displayed in various forms with some type of relationship information linking the various types of information may also be used.

In some cases, models use schemas to define relationships between different information represented by the model. For example, an org chart may begin with a "President" field and end with a "Part-time" field, where each field in between is linked to one or more other fields. For example, "President" may be linked to "Vice President" which may be linked to "Level 1 Manager" which may be linked to the "Part-time" field. Each of the links may be defined as a relationship, and each relationship may be stored as a constraint within the schema for that model. The schema may go on to define what types of information may be included in each field. For example, a "President" tag may be used in the schema to designate information associated with the company president. The "President" tag may allow for different information than the "Part-time" tag allows for. Information such as name, address, bio, resume, board memberships, etc. may all be available for the president, whereas only a portion of that information, or even entirely different information may be available for a part-time employee.

This example of using a schema and constraints to define information and relationships between information fields is merely one example of many types of possible uses for models, schemas and constraints. Multiple other variations are possible. This example is provided merely to illustrate the interrelationship between models, schemas and constraints.

In some embodiments, developer 105 is able to choose from the native underlying schemas, resulting in native underlying schema selection 106. In some cases, developer 105 may desire to change user-configurable characteristics of a model. For example, model 125, which is based on native underlying schema 111 and corresponding constraints 112, may have characteristics that developer 105 wants to alter in some manner.

In some embodiments, developer 105 may enter a declarative entry 107. Such declarative entries may include user-configurable model editor characteristics that may be used in the generation of a model editor (e.g. user-configurable characteristics 107A). For example, second receiving module 120 of computer system 101 may be configured to receive declarative entry 107 from developer 105, the declarative entry including user-configurable characteristics 107A. Second receiving module 120 may also be configured to send declarative entry 107 to declarative model editor generation module 130. Thus, generation module 130 may be configured to receive selected native underlying schema 111A from first receiving module 110 and declarative entry 107 from second receiving module 120. As used herein, generation may include compilation, interpretation, automatic generation and other forms of creation.

Declarative model editor generation module 130 may be configured to generate declarative model editors. In many cases, entities have a wide variety of models of varying types, many of which use different schemas and constraints. Different editors may be used to edit the models, each editor allowing the model to be edited according to its corresponding schema and constraints. Such editors may have different user interfaces, different functionality and different capabilities. Some editors may be custom tailored for editing a single model. Others have wider and more general capabilities. In some embodiments, generation module 130 may be configured to generate declarative model editors. A declarative model editor, as used herein, is a software application that allows a user to edit a model. Specifically, a declarative model editor allows a user to map one or more fields of a model to various other items including other fields while conforming to the model's schema and constraints. Thus, generation module 130 may be configured to generate a model editor specific to a model and/or schema with corresponding constraints.

For example, generation module 130 may be configured to receive selected native underlying schema 111A and declarative entry 107. Generation module 130 may use these selections to generate declarative model editor 140, the process of which will be described in greater detail below with reference to FIGS. 2 & 4. Generated declarative model editor 140 may be used to edit models including model 125. As a result, edited model 145 may be output and sent to developer 105 or, alternatively, to other users and/or computer systems.

Figure 4:
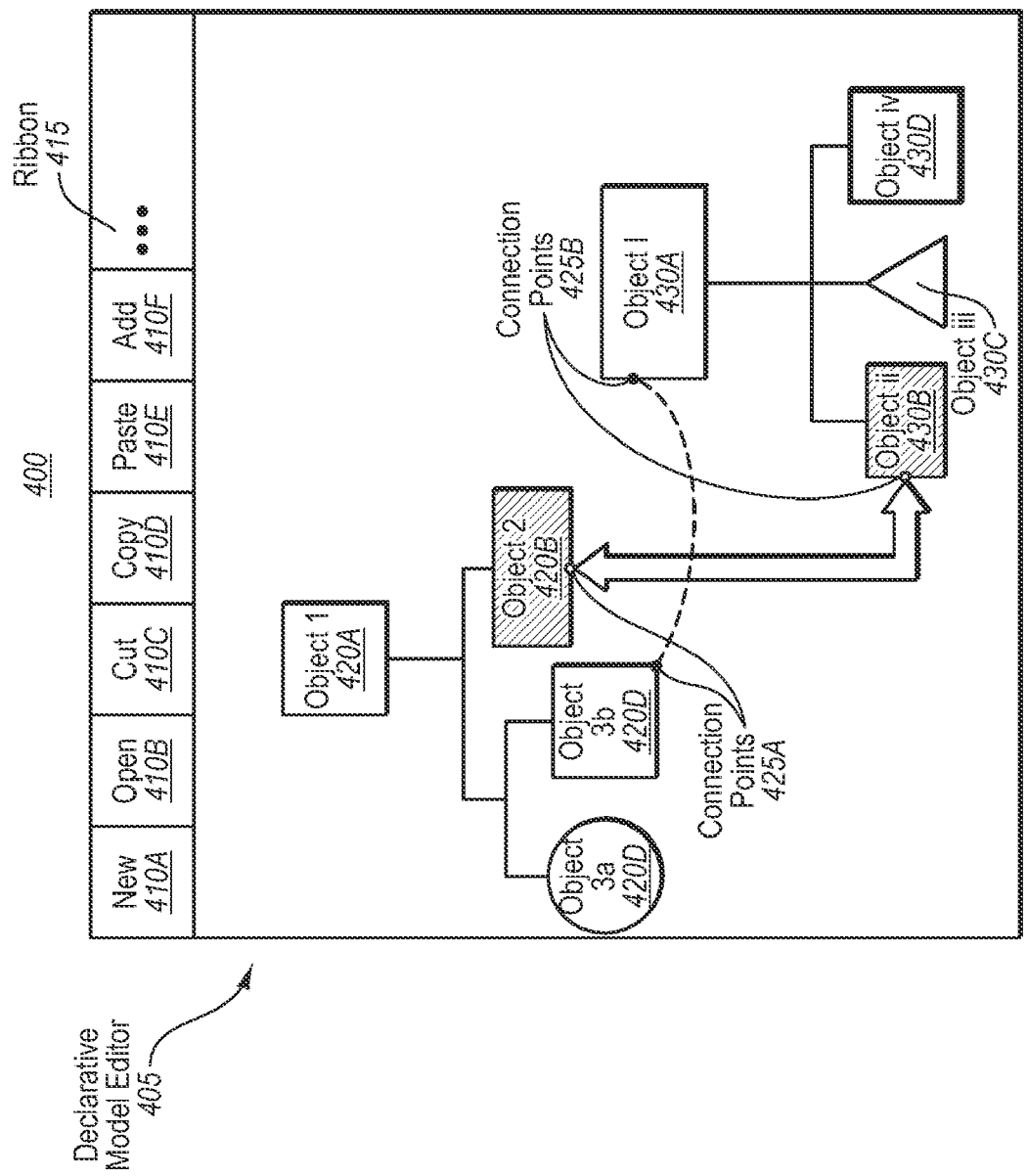
FIG. 4 illustrates an embodiment of the present invention depicting an example declarative model editor.

FIG. 2 illustrates a flowchart of a method 200 for generating a declarative model editor configured to provide model creation and editing functionality for a user. FIG. 4 illustrates an example declarative model editor. The method 200 will now be described with frequent reference to the components and data of environment 100 and the example declarative model editor of environment 400 in FIG. 4.

Method 200 includes an act of receiving a first user input indicating a selection of a native underlying schema, selected from a plurality of native underlying schemas, which is to be used in the generation of a declarative model editor corresponding to the selected native schema. The native schema comprises one or more constraints that are to be followed by models based on the native schema (act 210). For example, first receiving module 110 may receive selected native underlying schema selection 106 indicating a selection of a native underlying schema, selected from native underlying schemas 111. Native underlying schema selection 106 may be used by generation module 130 to generate declarative model editor 140 which corresponds to selected native underlying schema 111A. In some cases, selected native underlying schema 111A comprises constraints (e.g. constraints 112) that are to be followed during the creation or editing of models based on the native underlying schema, such as model 125.

In some embodiments, developer 105 may select from a group of native underlying schemas 111 with corresponding constraints 112. These schemas may include list-based, tree-based, container-based, diagram-based or any other types of schemas. The constraints 112 may define any type of relationship between various types of information and/or information fields in a model. Method 200 may also include an optional act of accessing the selected native schema based on the received first user input. For example, selected native underlying schema 111A may be accessed by declarative model editor generation module 130 for use in generating a declarative model editor based on native underlying schema selection 106, as further described below.

Method 200 also includes an act of receiving a second user input indicating a declarative entry that includes one or more user-configurable model editor characteristics configurable by a user for application to one or more of the models based on the selected native schema. The models are instances of the native schema (act 220). For example, second receiving module 120 may be configured to receive declarative entry 107 that includes one or more user-configurable model editor characteristics configurable by developer 105 for application to model 125 which is based on selected native underlying schema 111A.

User-configurable model editor characteristics 107A may comprise visualization settings including layout properties, object shapes, connectors, connector routing, and connection points on the object. For example, as shown in FIG. 4, declarative model editor 405, which, in some embodiments, is based on selected native underlying schema 111A and user-configurable model editor characteristics 107A of declarative entry 107, includes various objects of differing shapes, with different connectors, connector routing, and other elements.

For example, declarative model editor 405 may include ribbon 415 with various control containers 410A-F. Ribbon 415 is a user interface element that is one of many user-configurable model editor characteristics. Ribbon 415 may be any height, length or width and may include any number of control containers. Such control containers may include control commands such as New, Open, Cut, Copy, Paste, Add and other commands (410A-F). The control commands available in editor 405 in general, and specifically those included in ribbon 415 depend on the constraints of the schema. In some embodiments, the user-configurable model editor characteristics of declarative entry 107 take precedence over the constraints of selected native underlying schema 111A. In other cases, the opposite is true. In still other cases, developer 105 may select which constraints take precedence, thus allowing for some constraints of schema 111A and some user-configurable model editor characteristics from declarative entry 107.

Declarative model editor 405 may include other user-configurable model editor characteristics as illustrated in items 420A-430D. In some embodiments, objects 420A-420D may be viewed as a model and objects 430A-430D may be viewed as a separate model, each separately editable in editor 405. In other embodiments, objects 420A-420D and objects 430A-430D may be viewed as a single model with two or more subparts. Declarative model editor 405 may be configured to create and/or edit any number of models simultaneously or separately. Models may be joined together and/or split apart in conformance with each model's underlying schema and/or developer-entered declarative entry, depending on precedence information as explained above.

Objects may be illustrated in any shape including squares (e.g. 420D), circles (e.g. 420C), rectangles (e.g. 420B), triangles (e.g. 430C), or any other shape. In some embodiments, an object's shape may correspond to the type of information to be displayed in the object. In other cases, each shape may be editable by itself as a member of a group. Objects may be shaded (e.g. 420B and 430B) or otherwise identified using some type of background color or shading. The shading/coloring may correspond to objects that have a relationship as defined by the prevailing constraints. In some cases, the shading/coloring may be completely arbitrary and determined for each shape on an individual basis. Objects may have dark outlines (e.g. 430D), dotted outlines or other forms of lines. Objects may also have connection points (e.g. 425A and 425B) which signify places on the object that may be connected by a connector. Connectors may be lines, arrows, shapes or any other means of connecting objects. Connection points may define where a connector should be displayed in relation to an object. Thus, developer 105 may customize the above-listed or any other feature of the model editor, in accordance with the schema and corresponding constraints. Furthermore, each user-configurable characteristic may correspond to a relationship or elements as defined by the prevailing schema and constraints.

In some cases, at least one of the user-configurable model editor characteristics comprises a setting that allows the user to define which commands are to be performed based on a received user gesture. For example, if a user performs a drag and drop gesture where one object is selected, dragged and dropped to a new position, developer 105 may define which command is to be performed upon the completion of the gesture. In this case, developer 105 may specify that a drag and drop corresponds to a cut and paste operation, where the selected object is cut from its initial location and pasted into the "dropped" location. Many other gesture/command combinations are possible including mouse clicks, keyboard strokes, camera inputs or others gestures tied to commands such as cutting, copying, pasting, reconnecting, overwriting, and others. Each gesture/command combination is fully customizable by developer 105.

In some cases, receivable user gestures comprise those user gestures that are associated with the selected schema. For example, a schema may define which gestures are available to a user of editor 405 based on schema 111A and the schema's corresponding constraints. In some cases, certain gestures and/or commands may or may not be available, based on the type of model, the type or sensitivity of information (e.g. in secure environments), or based on other considerations. In some embodiments, method 200 may include an optional act of accessing the declarative entry based on the received second user input. For example, declarative model editor generation module 130 may access user-configurable model editor characteristics 107A included in declarative entry 107.

Method 200 also includes an act of automatically generating a declarative model editor based on the selected native schema and one or more user-configurable model editor characteristics (act 230). For example, declarative model editor configuration module 130 may automatically generate declarative model editor 140 based on selected native underlying schema 111A and one or more user-configurable model editor characteristics 107A as defined by declarative entry 107. In some cases, declarative model editor 140 may be generated based on a selected set of native schemas and one or more user-configured model editor characteristics.

As explained above, user-configurable model editor characteristics may include a setting that allows the user to select which of the command controls will appear in declarative model editor's control containers (e.g. control containers 410A-F). In some embodiments, declarative model editor 140 includes a shell with one or more control containers configured store command controls available to the declarative model editor user. The control containers may be displayed to developer 105 in ribbon 415 of model editor 405. Additionally or alternatively, the shell with the control containers may be used to display available control commands in a drop-down menu interface. For example, a user may click on a word such as "File" and a list of available control commands may be displayed below. In some cases, the user-configurable model editor characteristics comprise a setting that allows the user to select and/or modify the shell. For example, in a kiosk situation, developer 105 may desire to specify which commands are available to a user, and thereby limit commands available to the user, even where the commands were indicated as available by the schema and corresponding constraints. The control containers may include any of a file menu, a status bar and a user interface ribbon (e.g. ribbon 415).

FIG. 3 illustrates a flowchart of a method 300 for editing one or more characteristics of a model using a declarative model editor. The method 300 will now be described with frequent reference to the components and data of environment 100 and the example declarative model editor of FIG. 4.

Method 300 includes an act of receiving user input indicating a declarative entry to be applied to a model, the declarative entry comprising one or more user-configurable model editor characteristics configurable by a user for application to one or more models based on a selected native schema, the models being instances of the native schema (act 310). For example, declarative model editor generation module 130 may receive declarative entry 107 that is to be applied to model 125, declarative entry comprising one or more user-configurable model editor characteristics 107A configurable by developer 105 for application to model 125 based on selected native underlying schema 111A, where model 125 is an instance of schema 111A.

Method 300 also includes an act of generating a declarative model editor based on the declarative entry (act 320). For example, declarative model editor generation module may generate declarative model editor 140 based on declarative entry 107, as generally described above.

Method 300 includes an act of receiving a model, where the model is editable by the generated declarative model editor (act 330). For example, declarative model editor generation module may receive model 125, where model 125 is editable by generated declarative model editor 140. In some cases, model 125 is based on one of native underlying schemas 111 with corresponding constraints 112. In some cases, model 125 is based on selected native underlying schema 111A. Model 125 may be editable in a variety of fashions, including visualization settings, gesture/command settings, and other settings as defined above and in accordance with the schema and corresponding constraints.

Method 300 also includes an act of editing one or more user-configurable characteristics of the model, wherein the model characteristics conform to the constraints in the native underlying schema (act 340). For example, generated declarative model editor 140 may be configured to edit one or more user-configurable characteristics of model 125, where the model characteristics conform to the constraints in native underlying schema 111A. In some cases, editing comprises selecting declarative entries configured to be applied to the model. For example, developer 105 may select declarative entry 107 that includes user-configurable model editor characteristics 107A that the user desires to have applied to the model. Then, the declarative entries are applied by declarative model editor 140. In some cases, declarative entries 107 may include one or more of creating, replacing, updating and deleting user-configurable characteristics of the model. Thus, developer 105 may be able to select those user-configurable characteristics that the user wants to edit, and then may specify which function to perform, such as creating, replacing, updating and/or deleting. Any other function used to edit or create a model may also be available for selection.

In some cases, editing the user-configurable characteristics may include determining which data should be displayed as a shape, which data should be displayed as a connector, and where the connector should be displayed in relation to one or more objects of the model. For example, in a model of user names and positions (an org chart), developer 105 may determine that user names are to be displayed in a square box with a background color of blue for males and pink for females. Developer 105 can further specify that manager-employee relationships are to be displayed with a dotted line connector, from the bottom of each manager box to the top of each employee box. Developer 105 can further specify that each box is to be displayed 0.5 inches away from other boxes and how many boxes are displayed at a time. Many other visualization and relationship-based settings may be configured for editor 140 to be applied to edited model 145.

As previously mentioned, the user-configurable characteristics of the model includes the model's visual appearance including layout properties, object shapes, connectors, connector routing, and connection points on the object. Furthermore, the user-configurable model editor characteristics 107A may include a setting that allows developer 105 to define which commands are to be performed based on a received user gesture. Each edited model may be saved as a file with metadata corresponding to the declarative entry and the user-configurable characteristics (optional act 350). Thus, any changes made to the model may be permanently stored and recalled at a later time.

Accordingly, a method and system for generating a declarative model editor and editing a model using a generated declarative model editor is described. A computer user may select a native underlying schema, enter a declarative entry and, from these, generate a customized declarative model editor, usable to edit a wide variety of models that correspond to the native underlying schema and its related constraints.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing environment, a computer system comprising a framework for generating a declarative model editor configured to provide model creation and editing functionality for a user, the system comprising:
   a processor;
   system memory;
   a first receiving module configured to receive a first user input indicating a selection of a native underlying schema, selected from a plurality of native underlying schemas, that is to be used in the generation of a declarative model editor corresponding to the selected native schema, the native schema comprising one or more constraints that are to be followed by models based on the native schema;
   a second receiving module configured to receive a second user input indicating a declarative entry that includes one or more user-configurable model editor characteristics configurable by a user for application to one or more of the models based on the selected native schema, the models being instances of the native schema, wherein the model editor characteristics include one or more characteristics that are not specified by the native underlying schema and that customize the model editor for editing a selected model;
   a declarative model editor generation module configured to automatically generate a declarative model editor based on the selected native schema and one or more user-configurable model editor characteristics.

2. The system of claim 1, wherein the declarative model editor is generated based on a selected set of native schemas and one or more user-configured model editor characteristics.

3. The system of claim 1, wherein the declarative model editor includes a shell with one or more control containers configured store command controls available to the declarative model editor user.

4. The system of claim 3, wherein at least one of the user-configurable model editor characteristics comprises a setting that allows the user to select which of the command controls will appear in declarative model editor's control containers.

5. The system of claim 3, wherein at least one of the user-configurable model editor characteristics comprises a setting that allows the user to at least one of select and modify the shell.

6. The system of claim 3, wherein the control containers comprise at least one of a file menu, a status bar and a user interface ribbon.

7. The system of claim 1, wherein the declarative entry is at least one of a list-based, diagram-based, container-based and a tree-based schema.

8. The system of claim 1, wherein the user-configurable model editor characteristics comprise visualization settings including layout properties, object shapes, connectors, connector routing, and connection points on the object.

9. The system of claim 1, wherein at least one of the user-configurable model editor characteristics comprises a setting that allows the user to define which commands are to be performed based on a received user gesture.

10. The system of claim 9, wherein receivable user gestures comprise those user gestures that are associated with the declarative entry.

11. The system of claim 1, wherein at least one of the user-configurable model editor characteristics comprises a setting that allows a user to define which objects are capable of nesting other declarative model editors within the object.

12. At a computer system, a method for editing one or more characteristics of a model using a declarative model editor, the method comprising:
- an act of receiving user input indicating a declarative entry to be applied to a model, the declarative entry comprising one or more user-configurable model editor characteristics configurable by a user for application to one or more models based on a selected native schema, the models being instances of the native schema, the model editor characteristics including one or more characteristics that are not specified by the native underlying schema and that customize the model editor for editing a selected model;
- an act of generating a declarative model editor based on the declarative entry;
- an act of receiving a model, the model being editable by the generated declarative model editor; and
- an act of editing one or more user-configurable characteristics of the model, wherein the model characteristics conform to the constraints in the native underlying schema.

13. The method of claim 12, wherein the editing comprises selecting declarative functions configured to be applied to the model.

14. The method of claim 12, wherein the declarative functions include one or more of creating, replacing, updating and deleting user-configurable characteristics of the model.

15. The method of claim 12, wherein at least one of the user-configurable characteristics of the model includes the model's visual appearance including layout properties, object shapes, connectors, connector routing, and connection points on the object.

16. The method of claim 12, wherein editing the user-configurable characteristics comprises determining which data should be displayed as a shape, which data should be displayed as a connector, and where the connector should be displayed in relation to the one or more objects of the model.

17. The method of claim 12, further comprising an act of saving the edited model as a file with metadata corresponding to the declarative entry and the user-configurable model editor characteristics.

18. In a computing environment, a method for generating a declarative model editor configured to provide model creation and editing functionality for a user, the method comprising:
- an act of receiving a first user input indicating a selection of a native underlying schema, selected from a plurality of native underlying schemas, that is to be used in the generation of a declarative model editor corresponding to the selected native schema, the native schema comprising one or more constraints that are to be followed by models based on the native schema;
- an act of receiving a second user input indicating a declarative entry that includes one or more user-configurable model editor characteristics configurable by a user for application to one or more of the models based on the selected native schema, the models being instances of the native schema, the model editor characteristics including one or more characteristics that are not specified by the native underlying schema and that customize the model editor for editing a selected model;
- an act of automatically generating a declarative model editor based on the selected native schema and one or more user-configurable model editor characteristics.

19. The method of claim 18, further comprising an act of accessing the selected native schema based on the received first user input.

20. The method of claim 18, further comprising an act of accessing the declarative entry based on the received second user input.

* * * * *